US009981568B2

(12) United States Patent
Minamiura et al.

(10) Patent No.: US 9,981,568 B2
(45) Date of Patent: May 29, 2018

(54) POWER SUPPLY DEVICE FOR ELECTRIC VEHICLE

(71) Applicant: TOYOTA JIDOSHA KABUSHIKI KAISHA, Toyota-shi, Aichi-ken (JP)

(72) Inventors: Keiichi Minamiura, Nagoya (JP); Takuro Hayashi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 15/039,180

(22) PCT Filed: Feb. 4, 2015

(86) PCT No.: PCT/IB2015/000111
§ 371 (c)(1),
(2) Date: May 25, 2016

(87) PCT Pub. No.: WO2015/124980
PCT Pub. Date: Aug. 27, 2015

(65) Prior Publication Data
US 2017/0305292 A1    Oct. 26, 2017

(30) Foreign Application Priority Data

Feb. 21, 2014   (JP) .................... 2014-031764

(51) Int. Cl.
| | | |
|---|---|---|
| *B60L 1/00* | (2006.01) | |
| *B60L 11/18* | (2006.01) | |
| *H01M 2/10* | (2006.01) | |
| *H02J 7/00* | (2006.01) | |
| *B60K 1/00* | (2006.01) | |
| *B60K 6/28* | (2007.10) | |

(52) U.S. Cl.
CPC .......... *B60L 11/1874* (2013.01); *B60L 1/00* (2013.01); *B60L 11/1861* (2013.01); *B60L 11/1877* (2013.01); *H01M 2/1072* (2013.01); *H02J 7/0021* (2013.01); *B60K 6/28* (2013.01); *B60K 2001/005* (2013.01); *B60Y 2200/91* (2013.01); *B60Y 2200/92* (2013.01); *B60Y 2300/91* (2013.01); *B60Y 2400/112* (2013.01); *H01M 2220/20* (2013.01); *Y10S 903/907* (2013.01)

(58) Field of Classification Search
None
See application file for complete search history.

(56) References Cited

U.S. PATENT DOCUMENTS

| | | | | |
|---|---|---|---|---|
| 6,377,880 B1* | 4/2002 | Kato | ................. | B60K 6/485 |
| | | | | 180/65.26 |
| 2007/0152640 A1* | 7/2007 | Sasaki | ............... | B60H 1/00278 |
| | | | | 320/150 |
| 2012/0021258 A1* | 1/2012 | Kelty | .................. | B60L 3/0046 |
| | | | | 429/50 |

FOREIGN PATENT DOCUMENTS

JP      2012-080689 A     4/2012

* cited by examiner

*Primary Examiner* — Daniel Kessie
*Assistant Examiner* — Swarna N Chowdhuri
(74) *Attorney, Agent, or Firm* — Oliff PLC

(57) ABSTRACT

An ECU of an electric vehicle supplies a target rotation speed RT having a value corresponding to the temperature TB of a main battery to a cooler, controls a main DC/DC converter such that the SOC of an auxiliary battery is in a predetermined range SOCL to SOCH less than 100% when a cooling fan in the cooler is driven at the target rotation speed (RT), and controls the main DC/DC converter such that the SOC of the auxiliary battery is 100% when the cooling fan is not driven at the target rotation speed (RT).

11 Claims, 15 Drawing Sheets

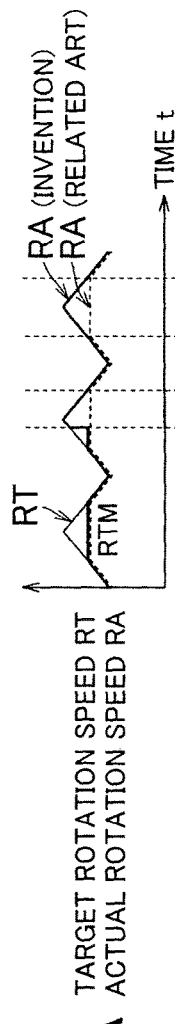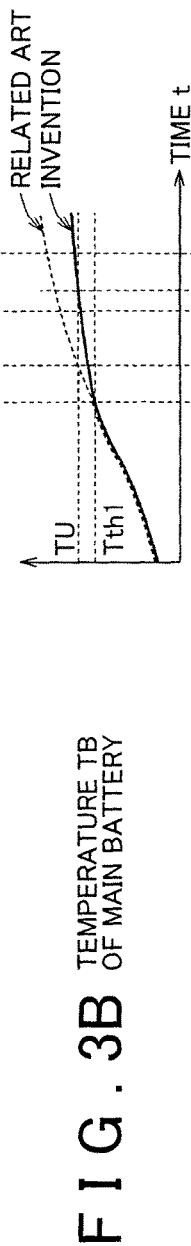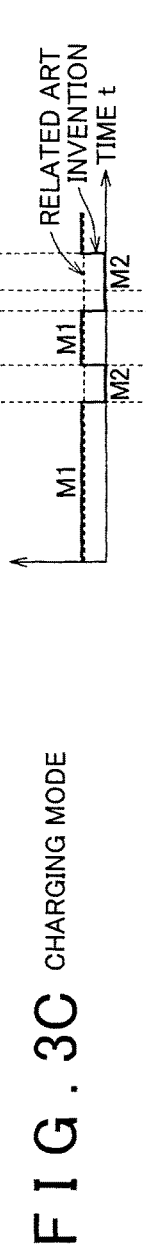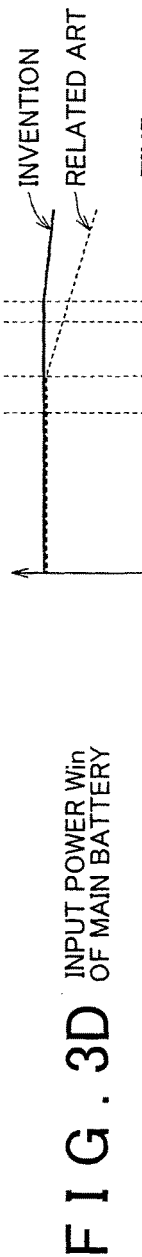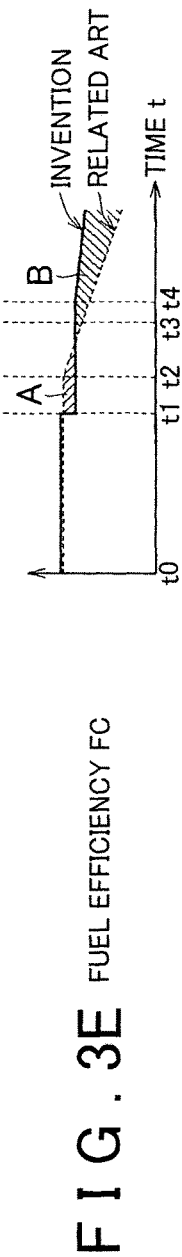
FIG. 3A TARGET ROTATION SPEED RT / ACTUAL ROTATION SPEED RA
FIG. 3B TEMPERATURE TB OF MAIN BATTERY
FIG. 3C CHARGING MODE
FIG. 3D INPUT POWER Win OF MAIN BATTERY
FIG. 3E FUEL EFFICIENCY FC

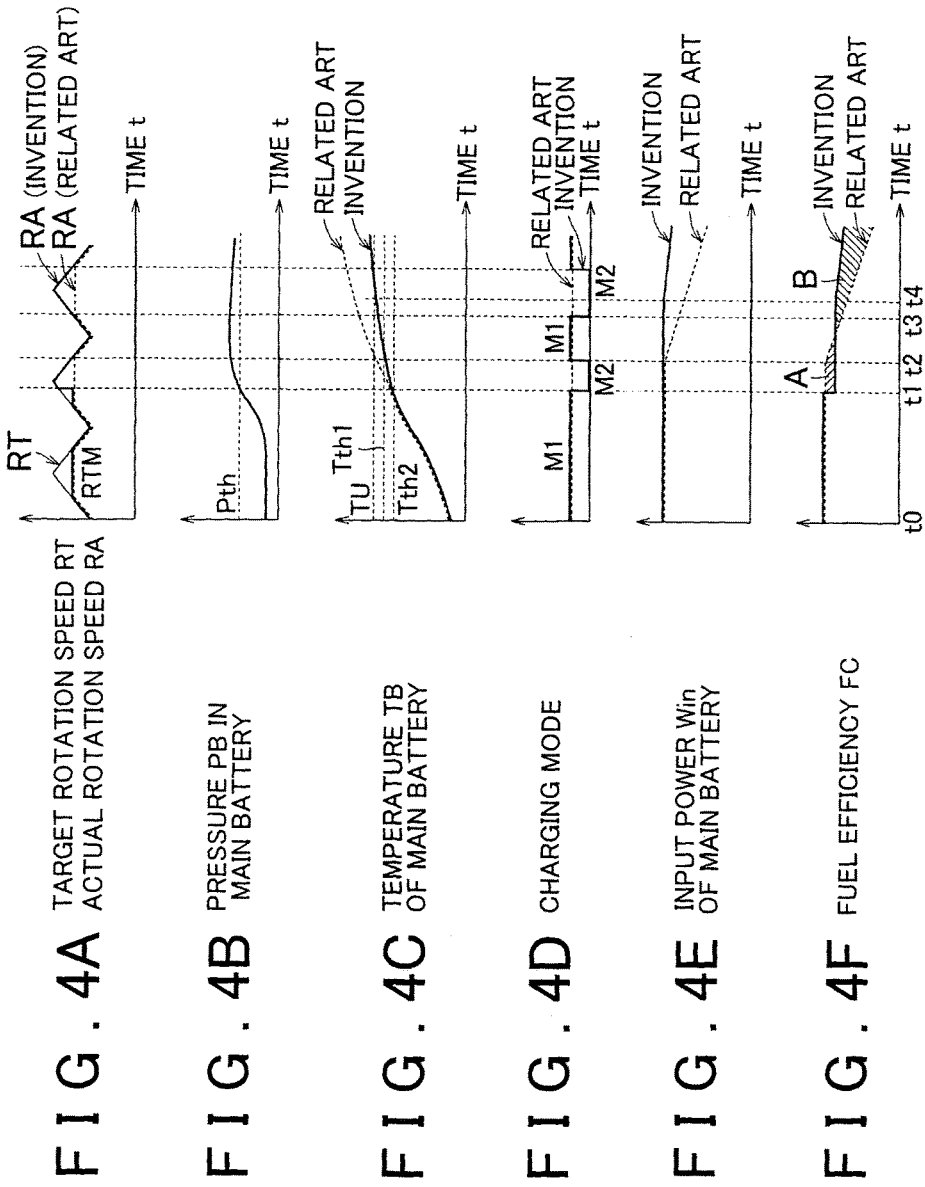

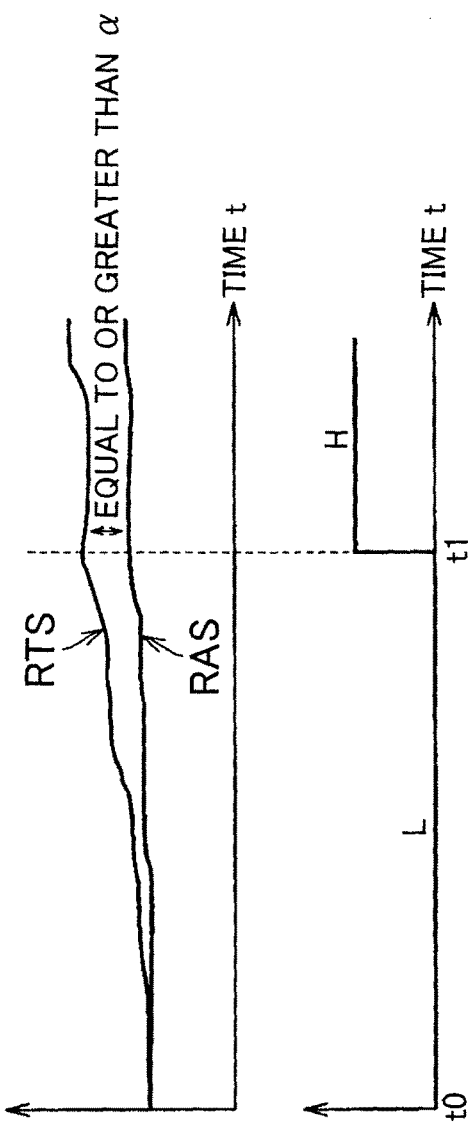

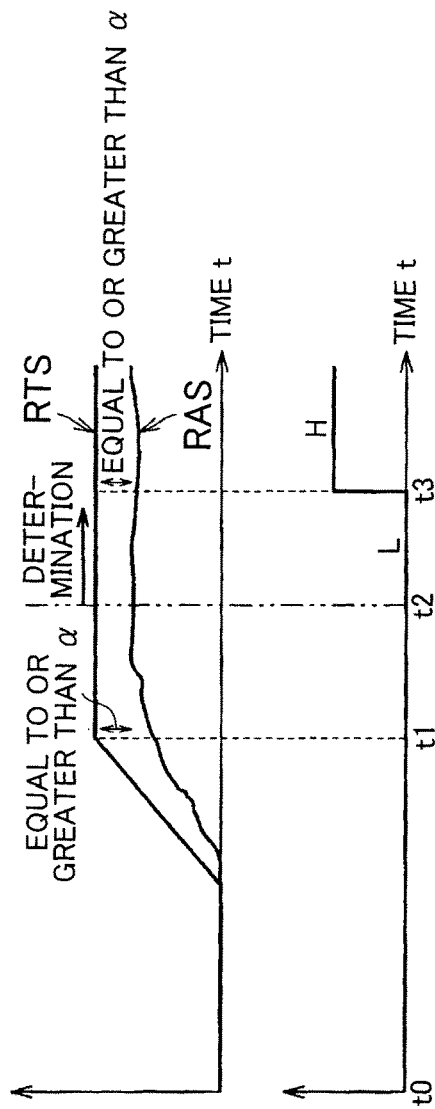

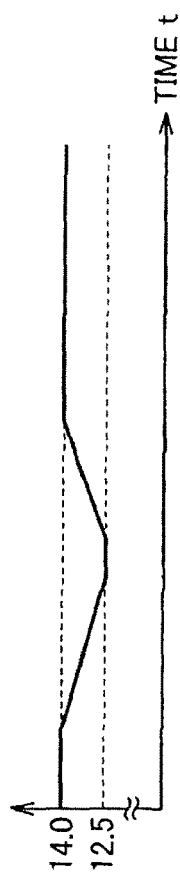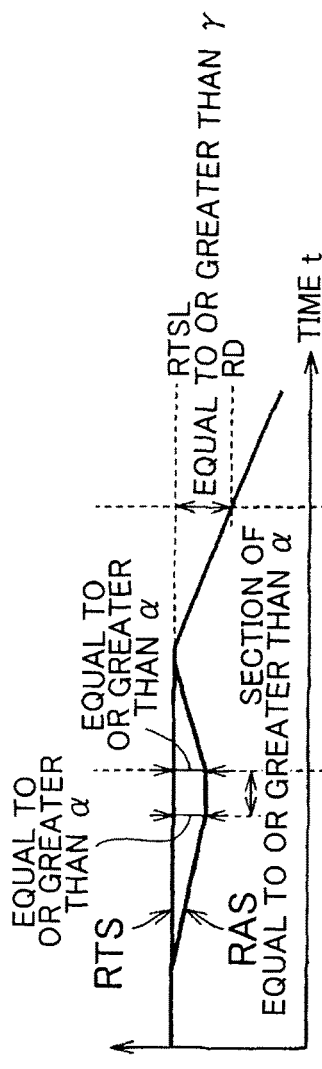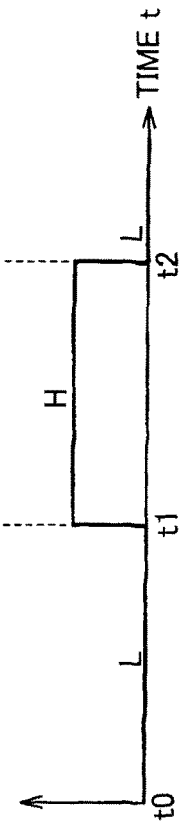

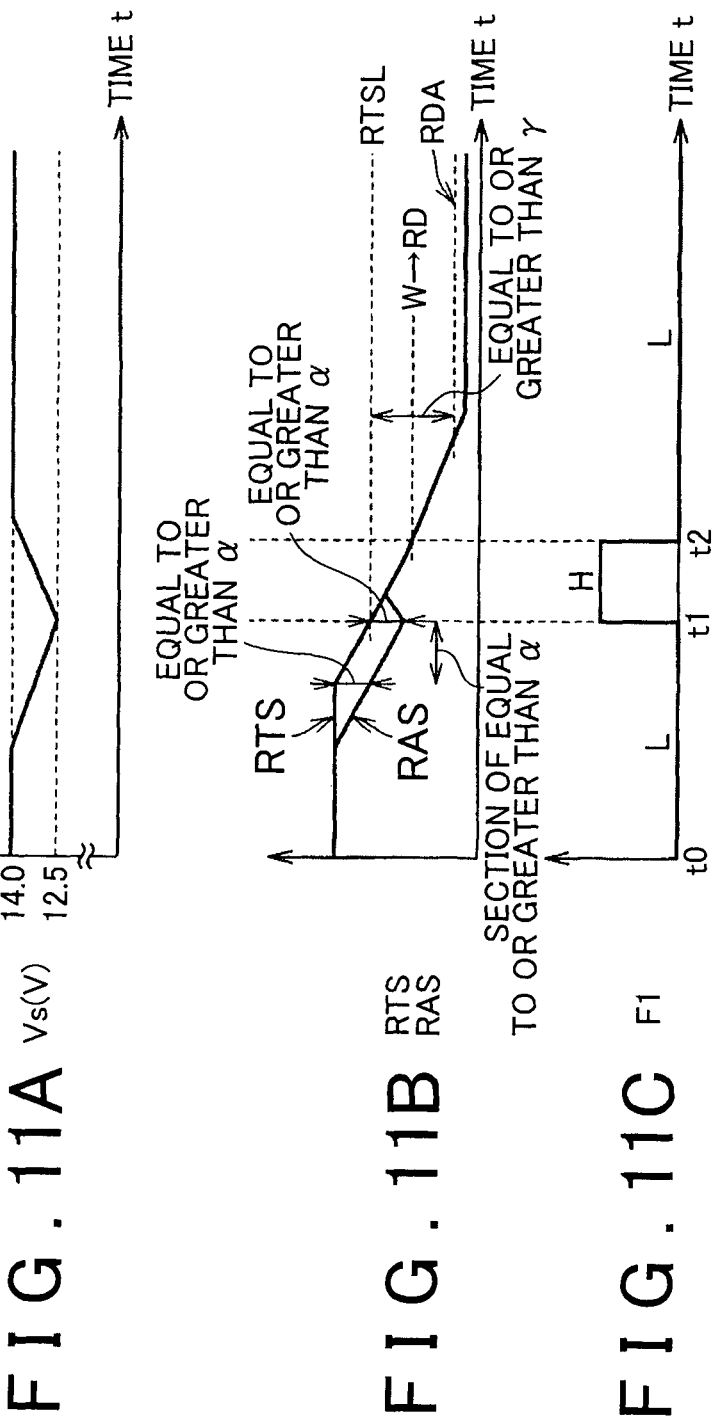

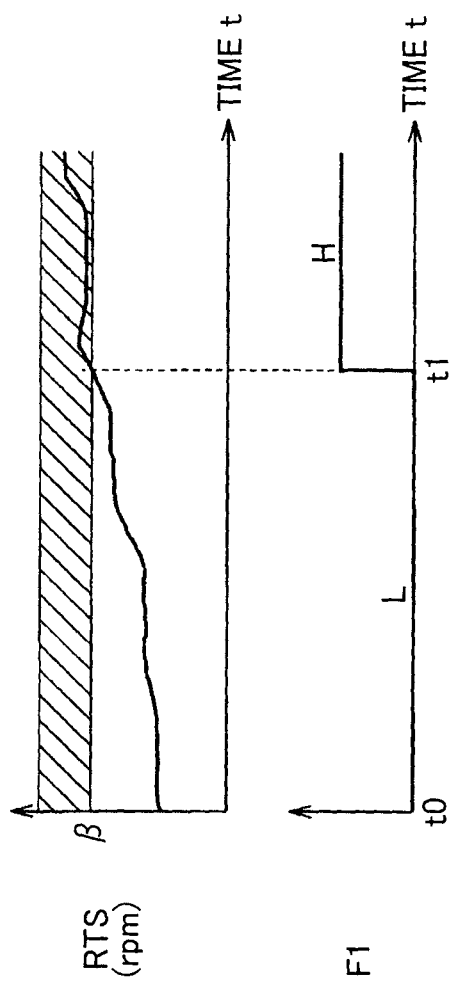

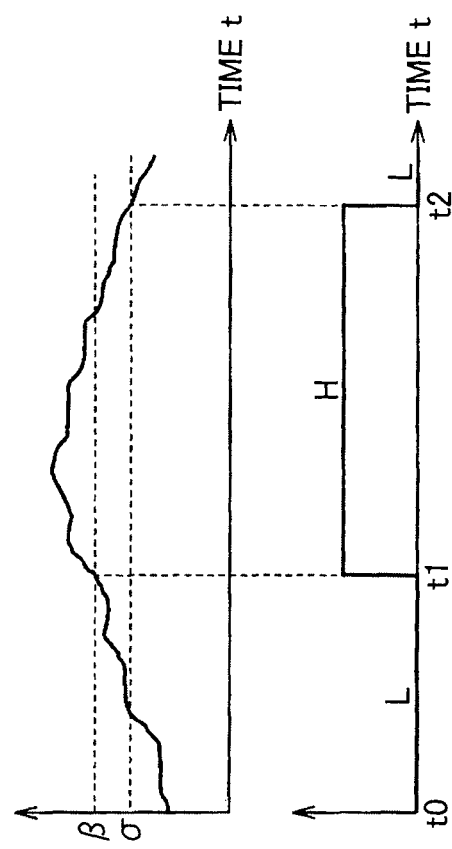
F I G. 15A
F I G. 15B

POWER SUPPLY DEVICE FOR ELECTRIC VEHICLE

BACKGROUND OF THE INVENTION

1. Field of the Invention

The present invention relates to a power supply device for an electric vehicle, and more particularly, to a power supply device for an electric vehicle equipped with a primary electric storage device and a secondary electric storage device.

2. Description of Related Art

In the related art, an electric vehicle such as a hybrid automobile or an electric automobile is equipped with a main battery (primary electric storage device) storing electric power for driving a motor coupled to vehicle wheels and an auxiliary battery (secondary electric storage device) storing DC power for driving an auxiliary load such as an audio device and a navigation device in the vehicle. The voltage across terminals of the main battery is stepped down and is supplied to the auxiliary battery.

In order to suppress the degradation of the main battery, for example, the electric vehicle is equipped with a cooler maintaining the temperature of the main battery within a predetermined range. The cooler is driven with the DC power of the auxiliary battery.

Japanese Patent Application Publication No. 2012-80689 (JP 2012-80689 A) discloses an electric vehicle in which the state of charge (SOC) of an auxiliary battery is maintained in a range less than 100% so as to enhance charging efficiency of the auxiliary battery and to enhance use efficiency of DC power of a main battery.

However, when the SOC of the auxiliary battery is maintained in a range less than 100%, there is a problem in that the cooling capability of the cooler becomes deficient, the temperature of the main battery rises, and the degradation of the main battery is promoted.

SUMMARY OF THE INVENTION

The invention is made in consideration of the above-mentioned problem and provides a power supply device of an electric vehicle that has high charging efficiency of a secondary electric storage device and that can suppress degradation of a primary electric storage device.

According to an aspect of the invention, there is provided a power supply device for an electric vehicle, including a primary electric storage device, a secondary electric storage device, a direct current/direct current converter, a cooler, a first detector, a second detector, a third detector, and an electronic control unit. The primary electric storage device is configured to store electric power for driving an electric motor coupled to vehicle wheels. The secondary electric storage device is configured to store direct current power for driving an auxiliary load. The direct current/direct current converter is configured to step down a voltage of the primary electric storage device and to supply the voltage to the secondary electric storage device to charge the secondary electric storage device. The cooler is configured to be supplied with a source voltage from the secondary electric storage device and to be driven depending on a target drive value to cool the primary electric storage device. The first detector is configured to detect a temperature of the primary electric storage device. The second detector is configured to detect a state of charge of the secondary electric storage device. The third detector is configured to detect an actual drive value of the cooler. (a) The electronic control unit is configured to operate based on detection results of the first detector, the second detector and the third detector. (b) The electronic control unit is configured to supply the target drive value to the cooler, the target drive value being a value corresponding to the temperature of the primary electric storage device. (c) The electronic control unit is configured to perform a first charging mode, and the electronic control unit (80) is configured to control the direct current/direct current converter in the first charging mode such that the state of charge of the secondary electric storage device is in a predetermined range less than a maximum value when the cooler is driven at the target drive value. (d) The electronic control unit is configured to perform a second charging mode, and the electric control unit is configured to control the direct current/direct current converter in the second charging mode such that the state of charge of the secondary electric storage device is a value greater than the predetermined range when the cooler is not driven at the target drive value.

According to this power supply device, when the cooler is driven at the target drive value, the state of charge of the secondary electric storage device is limited to a range less than the maximum value and it is thus possible to enhance charging efficiency of the secondary electric storage device. When the cooler is not driven at the target drive value, the state of charge of the secondary electric storage device is set to a value greater than the predetermined range and it is thus possible to enhance the cooling capability of the cooler and thus to suppress the degradation of the primary electric storage device.

In the power supply device, the value greater than the predetermined range may be a maximum value of the state of charge of the secondary electric storage device. According to this power supply device, it is possible to enhance the cooling capability of the cooler as much as possible.

In the power supply device, the electronic control unit may be configured to determine that the cooler is driven at the target drive value and to perform the first charging mode when a difference between the target drive value and the actual drive value is less than a first threshold value. The electronic control unit may be configured to determine that the cooler is not driven at the target drive value and to perform the second charging mode when the difference between the target drive value and the actual drive value is equal to or greater than the first threshold value. According to this power supply device, when the difference between the target drive value and the actual drive value of the cooler is great, it is possible to enhance the cooling capability of the cooler and thus to suppress the degradation of the primary electric storage device.

In the power supply device, the electronic control unit may be configured to stop the second charging mode and to perform the first charging mode when the second charging mode is performed and the target drive value is less than a second threshold value less by a predetermined value than a minimum value of the target drive value in a period in which the difference between the target drive value and the actual drive value is equal to or greater than the first threshold value. According to this power supply device, it is possible to prevent the charging mode from being frequently switched between the first charging mode and the second charging mode.

In the power supply device, the electronic control unit may be configured to determine that the cooler is driven at the target drive value and to perform the first charging mode when the target drive value is less than a first threshold value. The electronic control unit may be configured to determine that the cooler is not driven at the target drive value and to perform the second charging mode when the target drive value is equal to or greater than the first threshold value. According to this power supply device, it is not necessary to detect the actual drive value of the cooler and it is possible to enhance the cooling capability of the cooler and thus to suppress the degradation of the primary electric storage device when the target drive value of the cooler is great.

In the power supply device, the electronic control unit may be configured to stop the second charging mode and to perform the first charging mode when the second charging mode is performed and the target drive value is less than a second threshold value less by a predetermined value than the first threshold value. According to this power supply device, it is possible to prevent the charging mode from being frequently switched between the first charging mode and the second charging mode.

In the power supply device, the electronic control unit may be configured to determine whether the cooler is driven at the target drive value and to perform the first charging mode or the second charging mode when the temperature of the primary electric storage device is equal to or higher than a third threshold value. The electronic control unit may be configured to perform the first charging mode when the temperature of the primary electric storage device is lower than the third threshold value. According to this power supply device, it is possible to enhance the cooling capability of the cooler and thus to suppress the degradation of the primary electric storage device when the temperature of the primary electric storage device is high, and it is possible to perform the first charging mode to enhance the charging efficiency of the secondary electric storage device when the temperature of the primary electric storage device is low.

The power supply device may further include a fourth detector configured to detect a pressure in the primary electric storage device. The electronic control unit may be configured to determine whether the cooler is driven at the target drive value and to perform the first charging mode or the second charging mode when the temperature of the primary electric storage device is lower than the third threshold value and the temperature of the primary electric storage device is equal to or higher than a fourth threshold value less than the third threshold value and the pressure in the primary electric storage device is equal to or greater than a fifth threshold value. According to this power supply device, when the temperature of the primary electric storage device is low and the pressure in the primary electric storage device is high, it is possible to perform the second charging mode to suppress the rise in the temperature of the primary electric storage device.

In the power supply device, the second detector may be configured to detect the voltage of the secondary electric storage device as an approximate value of the state of charge of the secondary electric storage device. The electronic control unit may be configured to control the direct current/ direct current converter such that the voltage of the secondary electric storage device is in a predetermined voltage range less than a rated voltage in the first charging mode. The electronic control unit may be configured to control the direct current/direct current converter such that the voltage of the secondary electric storage device is a value greater than the predetermined voltage range in the second charging mode. According to this power supply device, it is possible to simply monitor the state of charge of the secondary electric storage device.

In the power supply device, the cooler may include a cooling fan that sends air to the primary electric storage device, the target drive value may be a target rotation speed of the cooling fan, and the actual drive value may be an actual rotation speed of the cooling fan. According to this power supply device, it is possible to cool the primary electric storage device using an air flow.

In the power supply device, the cooler may include a pump that circulates a coolant for cooling the primary electric storage device, the target drive value may be a target rotation speed of the pump, and the actual drive value may be an actual rotation speed of the pump. According to this power supply device, it is possible to cool the primary electric storage device using a coolant.

As described above, according to the invention, it is possible to enhance charging efficiency of a secondary electric storage device and to suppress degradation of a primary electric storage device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 3A to 3E are timing diagrams illustrating operations of the electric vehicle illustrated in FIG. 1;

FIGS. 4A to 4F are other timing diagrams illustrating operations of the electric vehicle illustrated in FIG. 1;

FIGS. 7A and 7B are timing diagrams illustrating a first modification example of Embodiment 2;

FIGS. 8A and 8B are timing diagrams illustrating a second modification example of Embodiment 2;

FIGS. 9A to 9C are timing diagrams illustrating a third modification example of Embodiment 2;

FIGS. 11A to 11C are timing diagrams illustrating a fifth modification example of Embodiment 2;

FIGS. 14A and 14B are timing diagrams illustrating a first modification example of Embodiment 3; and FIGS. 15A and 15B are timing diagrams illustrating a second modification example of Embodiment 3.

DETAILED DESCRIPTION OF EMBODIMENTS

Figure 1:
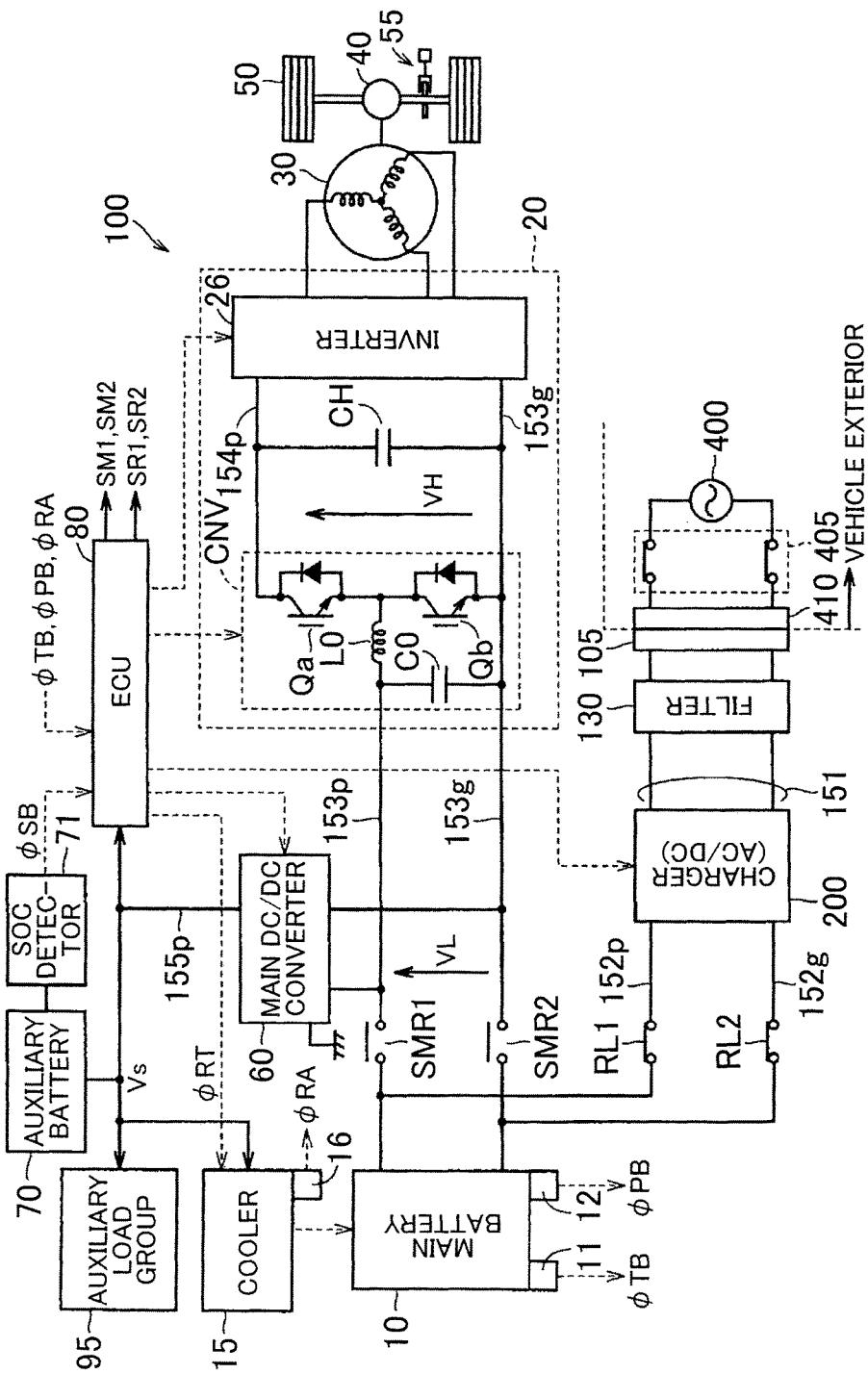
FIG. 1 is a circuit block diagram illustrating a configuration of an electric vehicle according to Embodiment 1 of the invention.

Embodiment 1 of the invention will be described below. FIG. 1 is a circuit block diagram illustrating a configuration of an electric vehicle 100 according to Embodiment 1 of the invention. In FIG. 1, the electric vehicle 100 includes a main battery 10, a power control unit (PCU) 20, a motor-generator set 30, a power transmission gear unit 40, vehicle wheels 50, a braking mechanism 55, and an electronic control unit (ECU) 80.

The main battery 10 is an example of the "primary electric storage device" and is typically constituted by a secondary battery such as a lithium ion battery or a nickel hydrogen battery. For example, the output voltage of the main battery 10 is about 200 V. The main battery 10 is provided with a temperature detector 11 and a pressure detector 12.

The temperature detector 11 detects the temperature TB of the main battery 10 and supplies a signal ϕPB indicating the detected value to the ECU 80. The pressure detector 12 detects the pressure PB in the main battery 10 and supplies a signal ϕPB indicating the detected value to the ECU 80. In order to suppress the degradation of the main battery 10, the temperature of the main battery 10 is maintained in a predetermined range on the basis of the signal ϕTB, and the pressure in the main battery 10 is maintained in a predetermined range on the basis of the signal ϕPB.

The PCU 20 converts charging and discharging power of the main battery 10 into electric power for controlling the driving of the motor-generator set 30. For example, the motor-generator set 30 is constituted by a permanent magnet type three-phase synchronous electric motor and the PCU 20 is configured to include an inverter 26.

The output torque of the motor-generator set 30 is transmitted to the vehicle wheels 50 via a power transmission gear unit 40, which is constituted by a reduction gear or a power splitting mechanism, to cause the electric vehicle 100 to travel. The motor-generator set 30 can generate electric power using the rotational force of the vehicle wheels 50 at the time of regenerative braking of the electric vehicle 100. The generated electric power is converted into charging power of the main battery 10 by the PCU 20.

The braking mechanism 55 generates a mechanical braking force for the vehicle wheels 50. The braking mechanism 55 is typically constituted by a hydraulic brake configured to generate a frictional braking force with a supply of a hydraulic pressure. At the time of operating a brake pedal of the electric vehicle 100, the total braking force corresponding to the operation of the brake pedal is secured by the sum of the mechanical braking force based on the braking mechanism 55 and the regenerative braking force based on the motor-generator set 30.

That is, the ECU 80 generates the regenerative braking force based on the motor-generator set 30 on the basis of the detection results of the detectors 11, 12, and the like and the upper limit Win of the charging power of the main battery 10 within a range in which the main battery 10 is not overcharged. On the other hand, the difference between the total braking force and the regenerative braking force is secured by the mechanical braking force based on the braking mechanism 55. Accordingly, when the charging of the main battery 10 is inhibited, only the braking mechanism 55 needs to be continuously operated. In this case, there is a possibility that the braking mechanism 55 will be overheated.

In a hybrid vehicle equipped with an engine (not illustrated) in addition to the motor-generator set 30, a necessary vehicle driving force of the electric vehicle 100 is generated by causing the engine and the motor-generator set 30 to operate in cooperation with each other. At this time, the main battery 10 may be charged with the electric power generated by the rotation of the engine.

That is, the electric vehicle 100 means a vehicle equipped with an electric motor for generating a vehicle driving force and examples thereof include a hybrid automobile that generates the vehicle driving force using the engine and the electric motor and an electric automobile and a fuel cell vehicle not equipped with an engine.

The elements other than the motor-generator set 30, the power transmission gear unit 40, and the vehicle wheels 50 in the configuration of the illustrated electric vehicle 100 constitute the "power supply device of an electric vehicle". The configuration of the power supply device will be described below in detail.

The PCU 20 includes a converter CNV, a smoothing capacitor CH, an inverter 26. The converter CNV is configured to switch the DC voltage between a DC voltage VL between power lines 153*p*, 153*g* and a DC voltage VH between power lines 154*p*, 153*g*.

The power lines 153*p*, 153*g* are electrically connected to the positive electrode terminal and the negative electrode terminal of the main battery 10 via system main relays SMR1, SMR2, respectively. The smoothing capacitor CH is connected to the power lines 154*p*, 153*g* and smooths the DC voltage. Similarly, the smoothing capacitor C0 is connected to the power lines 153*p*, 153*g* and smooths the DC voltage VL.

The converter CNV is constituted as a chopper circuit including power semiconductor switching elements Qa, Qb, a reactor L0, and a smoothing capacitor C0. Examples of the power semiconductor switching element (hereinafter, simply referred to as "switching element") include an insulated gate bipolar transistor (IGBT), a power metal oxide semiconductor (MOS) transistor, and a power bipolar transistor.

A diode is connected in antiparallel to each of the switching elements Qa, Qb. The converter CNV can perform bidirectional voltage conversion between the power line 153*p* and the power line 154*p*. Alternatively, by fixing the switching element Qa as an upper arm element to an ON state and fixing the switching element Qb as a lower arm element to an OFF state, the converter CNV may be made to operate so as to cause the voltages of the power lines 154*p*, 153*p* to be equal to each other (VH=VL).

The inverter 26 is a known three-phase inverter and thus the detailed circuit configuration thereof is not illustrated. For example, the inverter 26 is configured such that an upper arm element and a lower arm element are arranged for each phase and a connecting point of the upper and lower arm elements for each phase is connected to a coil winding of a stator in the corresponding phase of the motor-generator set 30.

When the electric vehicle 100 travels, the inverter 26 converts the DC voltage of the power line 154*p* into a three-phase AC voltage and supplies the converted voltage to the motor-generator set 30 by causing the ECU 80 to control the ON/OFF states of the respective switching elements. Alternatively, when the electric vehicle 100 performs a regenerative braking operation, the ON/OFF states of the respective switching elements are controlled by the ECU 80 such that the inverter 26 converts the AC voltage from the motor-generator set 30 into a DC voltage and outputs the converted DC voltage to the power line 154*p*.

The ECU 80 is constituted by an electronic control unit including a central processing unit (CPU) and a memory, which are not illustrated, and is configured to perform operating processes using the detected values of the detectors 11, 12, 16, 71, and the like on the basis of a map and a program stored in the memory. Alternatively, at least a part of the ECU 80 may be configured to perform predetermined numerical and logical operating processes using hardware such as an electronic circuit. The ECU 80 is comprehensively marked as a block having a control function when the electric vehicle 100 travels and is externally charged. The ECU 80 operates with a supply of a source voltage of a low voltage system from a power line 155*p*. The ECU 80 constitutes the "control device".

The power supply device of the electric vehicle 100 includes a main direct current/direct current converter (hereinafter called as DC/DC converter) 60, an auxiliary battery 70, and a power line 155*p* as the configuration of a low voltage system (auxiliary system). The auxiliary battery 70 is connected to the power line 155*p*. The auxiliary battery 70 is an example of the "secondary electric storage device". For example, the auxiliary battery 70 is constituted by a lead battery. The output voltage of the auxiliary battery 70 corresponds to the source voltage Vs of the low voltage system. The rated value of the source voltage Vs is lower than the output voltage of the main battery 10 and is, for example, about 12 V.

The auxiliary battery 70 is provided with an SOC detector 71 detecting the SOC of the auxiliary battery 70. The SOC detector 71 detects the SOC of the auxiliary battery 70 on the basis of the voltage across terminals Vs, the current, and the temperature of the auxiliary battery 70, and supplies a signal φSB indicating the detected value to the ECU 80. The SOC detector 71 includes, for example, a voltage detector detecting the voltage across terminals Vs of the auxiliary battery 70, a current detector detecting a charging current and discharging current of the auxiliary battery 70, a temperature detector detecting the temperature of the auxiliary battery 70, and a computing unit calculating the SOC of the auxiliary battery 70 on the basis of the detected values of three detectors and outputting a signal SB indicating the calculated SOC.

The SOC of the auxiliary battery 70 is adjusted on the basis of the signal φSB so as to be 100% or to be in a predetermined range (a range between a lower limit SOCL and an upper limit SOCH) less than 100%. The limiting of the SOC of the auxiliary battery 70 to the predetermined range SOCL to SOCH less than 100% is performed to enhance the charging efficiency of the auxiliary battery 70. When the DC power of the auxiliary battery 70 is insufficient, the limiting of the SOC of the auxiliary battery 70 is stopped and the auxiliary battery 70 is charged such that the SOC of the auxiliary battery 70 is 100%. When charging power is supplied from the outside of the electric vehicle 100, the SOC of the auxiliary battery 70 is set to 100% to refresh the auxiliary battery 70.

The output side of the main DC/DC converter 60 is connected to the power line 155*p*. The input side of the main DC/DC converter 60 is connected to the power lines 153*p*, 153*g*. The main DC/DC converter 60 converts the output power of the main battery 10 into auxiliary-system power (level of the source voltage Vs) and outputs the converted power to the power line 155*p*. The output voltage (DC voltage VL) of the main battery 10 is stepped down to the source voltage Vs of the auxiliary system by this power conversion. The main DC/DC converter 60 is typically constituted by a switching regulator including a semiconductor switching element (not illustrated) and can employ an arbitrary circuit configuration. The main DC/DC converter 60 is controlled by the ECU 80 so as to adjust the source voltage Vs such that the SOC of the auxiliary battery 70 is 100% or in the predetermined range SOCL to SOCH.

The power line 155*p* is connected to an auxiliary load group 95 of the low voltage system. The auxiliary load group 95 includes, for example, an audio unit, a navigation unit, and an illumination unit (such as a hazard lamp, an interior lamp, and a head lamp). The auxiliary load group 95 operates in response to a user's operation to consume the power of the auxiliary battery 70 when the vehicle travels and is externally charged.

The power line 155*p* is connected to a cooler 15 cooling the main battery 10 to maintain the temperature of the main battery 10 in a predetermined range. The cooler 15 includes a cooling fan sending air to the main battery 10. The cooling fan is driven with the source voltage Vs and rotates at a rotation speed based on a target rotation speed (target drive value) RT from the ECU 80. When the source voltage Vs is a rated voltage, an actual rotation speed RA (actual rotation speed) of the cooling fan is approximately equal to the target rotation speed RT. However, the SOC of the auxiliary battery 70 is limited to the predetermined range SOCL to SOCH. Accordingly, when the source voltage Vs is lower than the rated voltage and the target rotation speed RT is high, the actual rotation speed RA of the cooling fan is lower than the target rotation speed RT.

The cooler 15 is provided with a rotation speed detector 16. The rotation speed detector 16 detects the actual rotation speed RA (revolutions/second) of the cooling fan and supplies a signal φRA indicating the detected value to the ECU 80. The ECU 80 generates the target rotation speed RT having a value based on the temperature TB of the main battery 10 on the basis of the output signal φTB of the temperature detector 11.

When the cooling fan of the cooler 15 is driven at the target rotation speed RT, the ECU 80 controls the main DC/DC converter 60 such that the SOC of the auxiliary battery 70 is in the predetermined range SOCL to SOCH. When the cooling fan of the cooler 15 is driven at a rotation speed lower than the target rotation speed RT, the ECU 80 controls the main DC/DC converter 60 such that the SOC of the auxiliary battery 70 is 100%.

The power supply device of the electric vehicle 100 includes a charging connector 105, an LC filter 130, a charger 200, and relays RL1, RL2 as the configuration of an external charging system of the main battery 10.

The charging connector 105 is electrically connected to an external power supply 400 by connection to a charging plug 410 of a charging cable which has been connected to the external power supply 400. It is assumed that a relay 405 for cutting off a charging path of the external power supply 400 is built in the charging cable. In general, the external power supply 400 is a commercially-available AC power source.

A configuration in which power is supplied by electromagnetically coupling the external power supply 400 and the electric vehicle 100 to each other without coming in direct contact with each other may be employed instead of the configuration illustrated in FIG. 1. Specifically, a primary coil may be disposed on the external power supply 400 side, a secondary coil may be disposed on the electric vehicle 100 side, and electric power may be supplied from the external power supply 400 to the electric vehicle 100 using mutual inductance between the primary coil and the secondary coil. When this external charging is performed, the configuration subsequent to the LC filter 130 switching the electric power supplied from the external power supply 400 can be communized.

A power line 151 electrically connects the charging connector 105 and the charger 200 to each other. The LC filter 130 is inserted into the power line 151 and removes a harmonic component of the AC voltage. The charger 200 converts the AC voltage, which has been transmitted to the power line 151 from the external power supply 400, into a DC voltage for charging the main battery 10. The converted DC voltage is output to between power lines 152p, 152g. At this time, the DC voltage of the power lines 152p, 152g is controlled to a voltage level suitable for charging the main battery 10.

The relay RL1 is electrically connected between the power line 152p and the positive electrode of the main battery 10. The relay RL2 is electrically connected between the power line 152g and the negative electrode of the main battery 10.

Each of the relays RL1, RL2 and the system main relays SMR1, SMR2 is typically constituted by an electronic relay that is connected (turned on) when an excitation current is supplied by an excitation circuit not illustrated and that is disconnected (turned off) when an excitation current is not supplied. Here, an arbitrary circuit element can be used as the relay or the system main relay as long as it is a switch that can control connection (turning-on)/disconnection (turning-off) of the power supply path.

The ECU 80 generates control command signals SM1, SM2, SR1, SR2 for controlling the turning-on/turning-off of the system main relays SMR1, SMR2 and the relays RL1, RL2. In response to the control command signals SM1, SM2, SR1, SR2, the excitation current of the corresponding system main relay or the corresponding relay is generated using the auxiliary battery 70 as a power source.

Figure 2:
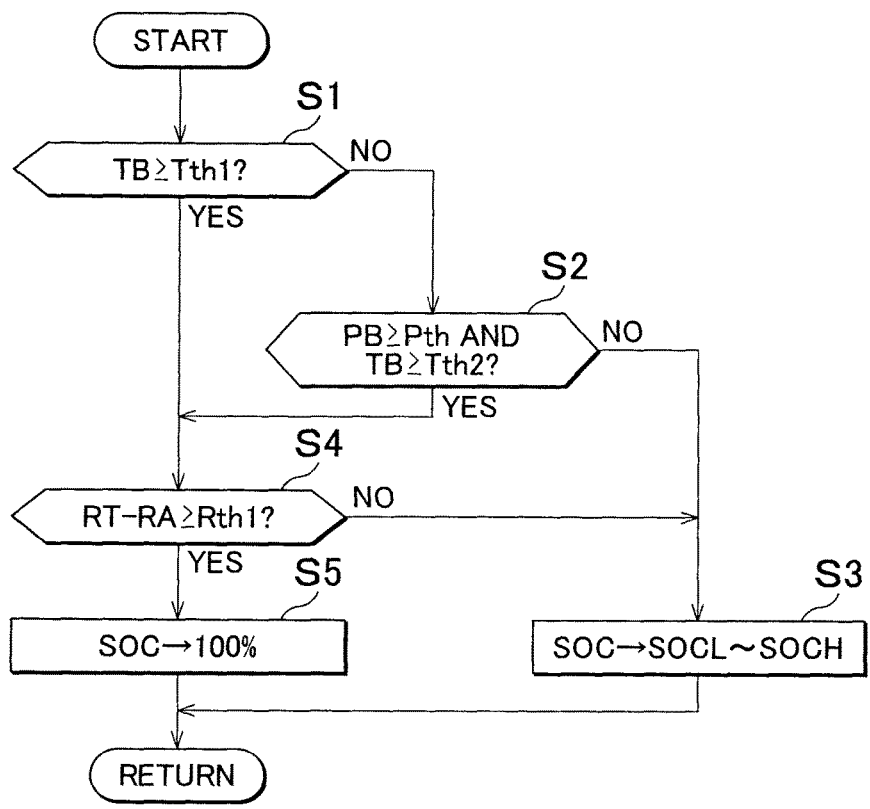
FIG. 2 is a flowchart illustrating a method of charging an auxiliary battery illustrated in FIG. 1.

FIG. 2 is a flowchart illustrating a method of charging the auxiliary battery 70. In step S1 of FIG. 2, the ECU 80 determines whether the temperature TB of the main battery 10 is equal to or higher than a first threshold temperature Tth1 (TB≥Tth1). The first threshold temperature Tth1 is a temperature lower by a predetermined temperature T1 than an input and output limit start temperature TU of the main battery 10 (Tth1=TU−T1).

Step S1 is provided for the following reason. That is, when the temperature TB of the main battery 10 is equal to or higher than the input and output limit start temperature TU, the input and output of the main battery 10 is limited and the operation frequency of the engine increases to degrade the fuel efficiency of the electric vehicle 100. Accordingly, by setting the SOC of the auxiliary battery 70 to 100% to enhance the cooling capability of the cooler 15 before the temperature TB is equal to or higher than the temperature TU, the temperature TB of the main battery 10 is maintained to be lower than the first threshold temperature Tth1.

When it is determined in step S1 that TB≥Tth1 is not established, it is determined in step S2 whether the pressure PB in the main battery 10 is equal to or greater than a threshold pressure Pth (PB≥Pth) and the temperature TB of the main battery 10 is equal to or higher than a second threshold temperature Tth2 (TB≥Tth2). The second threshold temperature Tth2 is a temperature lower by a predetermined temperature T2 than the input and output limit start temperature TU of the main battery 10 (Tth2=TU−T2). Here, T2>T1 is established.

Step S2 is provided for the following reason. That is, when the temperature TB of the main battery 10 rises by side reaction heat (that is, when PB≥Pth), the amount of heat emitted from the main battery 10 is great. Accordingly, the cooling capability of the cooler 15 is enhanced with the temperature Tth2 lower than the first threshold temperature Tth1 in step S1 to suppress the rise in the temperature of the main battery 10.

When it is determined in step S2 that PB≥Pth and TB≥Tth2 are not established, the main DC/DC converter 60 is controlled such that the SOC of the auxiliary battery 70 is in the range SOCL to SOCH less than 100% in step S3 and then the process flow is returned to step S1. When the SOC of the auxiliary battery 70 is limited to the range SOCL to SOCH less than 100%, the charging efficiency of the auxiliary battery 70 is enhanced and the fuel efficiency of the electric vehicle 100 is improved.

When it is determined in step S1 that TB≥Tth1 is established, it is determined in step S4 whether the difference between the target rotation speed RT and the actual rotation speed RA of the cooling fan in the cooler 15 is equal to or greater than a first threshold rotation speed Rth1 (RT−RA≥Rth1). When RT−RA≥Rth1 is not established, the cooling fan is rotationally driven at the rotation speed RA close to the target rotation speed RT and thus the process flow goes to step S3.

When it is determined in step S4 that RT−RA≥Rth1 is established, the voltage Vs of the auxiliary battery 70 is lowered and the cooling fan is not rotationally driven at the target rotation speed RT. Accordingly, in step S5, the main DC/DC converter 60 is controlled such that the SOC of the auxiliary battery 70 is 100%, and the process flow is returned to step S1.

FIGS. 3A to 3E are timing diagrams illustrating the operation of the electric vehicle 100. Particularly, FIG. 3A illustrates the target rotation speed RT and the actual rotation speed RA of the cooling fan of the cooler 15, FIG. 3B illustrates the temperature TB of the main battery 10, FIG. 3C illustrates the charging mode of the auxiliary battery 70, FIG. 3D illustrates input power to the main battery 10, and FIG. 3E illustrates the fuel efficiency FC.

In FIGS. 3A to 3E, the invention is marked by a solid line and the related art is marked by a dotted line. It is assumed that the target rotation speed RT of the cooling fan is changed in a triangular waveform with a predetermined cycle, so as to increase from a minimum value to a maximum value with a constant slope and to decrease from the maximum value to the minimum value with a constant slope. The charging mode in which the SOC of the auxiliary battery 70 is maintained in the predetermined range SOCL to SOCH is referred to as first charging mode M1, and the charging mode in which the SOC of the auxiliary battery 70 is set to 100% is referred to as second charging mode M2.

It is assumed that constant power is supplied to the main battery 10 and the temperature TB of the main battery 10 slowly rises. It is assumed that the pressure PB in the main battery 10 is lower than a threshold pressure Pth (PB<Pth). Accordingly, in the flowchart illustrated in FIG. 2, the process flow goes from step S2 to step S3.

At times t0 to t1, the temperature TB of the main battery 10 slowly rises in a range (TB<Tth1) lower than the first threshold temperature Tth1. Since TB<Tth1 is established, the first charging mode M1 is performed, the input power Win of the main battery 10 is maintained at the maximum value, and the fuel efficiency FC is maintained at the maximum value.

When the target rotation speed RT of the cooling fan is lower than a predetermined value RTM (a median value between the maximum value and the minimum value in the drawing), the cooling fan is rotationally driven to follow the target rotation speed RT and the actual rotation speed RA becomes equal to the target rotation speed RT. However, when the target rotation speed RT of the cooling fan is higher than the predetermined value RTM, the power of the auxiliary battery 70 is insufficient, the cooling fan is not rotationally driven to follow the target rotation speed RT, and the actual rotation speed RA is kept constant at the predetermined value RTM.

When the temperature TB of the main battery 10 reaches the first threshold temperature Tth1 (TB≥Tth1) and the difference between the target rotation speed RT and the actual rotation speed RA of the cooling fan reaches the first threshold rotation speed Rth1 (RT−RA≥Rth1), the charging mode is switched from M1 to M2 (at time t1). In the second charging mode M2, since the SOC of the auxiliary battery 70 is 100%, the insufficiency in power is solved, the cooling fan is rotationally driven to follow the target rotation speed RT, and the actual rotation speed RA is equal to the target rotation speed RT.

In the related art, only the first charging mode M1 is provided. Accordingly, when the power of the cooling fan is insufficient, the cooling fan is not rotationally driven to follow the target rotation speed RT and the actual rotation speed RA is saturated at a vale lower than the target rotation speed RT. As a result, the temperature TB of the main battery 10 is higher in the related art than in the invention. Here, at the time point at which the charging mode is switched from M1 to M2, the fuel efficiency FC of the invention is slightly lower than the fuel efficiency in the related art.

When the target rotation speed RT of the cooling fan is lowered and reaches the predetermined value RTM (at time t2), the actual rotation speed RA is substantially equal to the target rotation speed RT, thus the charging mode is switched from M2 to M1, and the fuel efficiency FC is maintained at a relatively high level.

In the electric vehicle according to the related art, the temperature TB of the main battery 10 reaches the input and output limit start temperature TU (at time t2), the input power Win of the main battery 10 decreases, and the fuel efficiency FC suddenly decreases.

In the invention, when the target rotation speed RT of the cooling fan becomes higher than the predetermined value RTM again, the power of the auxiliary battery 70 is insufficient, the cooling fan is not rotationally driven to follow the target rotation speed RT, the actual rotation speed RA is kept constant at RTM, and the charging mode is switched from M1 to M2 (at time t3). At time t4, the temperature TB of the main battery 10 reaches the input and output limit start temperature TU, the input power Win of the main battery 10 decreases, and the fuel efficiency FC decreases.

As can be seen from FIGS. 3A to 3E, according to the invention, it is possible to suppress the increase rate of the temperature TB of the main battery 10 to be lower than that in the related art. Accordingly, it is possible to delay the reaching of TB to the input and output limit start temperature TU, it is possible to maintain the input power Win of the main battery 10 at a high level, and it is possible to improve the fuel efficiency FC. In FIG. 3E, the area of region A represents the decrease in the fuel efficiency FC in the invention and the area of region B represents the increase in the fuel efficiency FC in the invention. Accordingly, the fuel efficiency FC is further improved than that in the related art.

FIGS. 4A to 4F are timing diagrams illustrating the operation of the electric vehicle 100. Particularly, FIG. 4A illustrates the target rotation speed RT and the actual rotation speed RA of the cooling fan of the cooler 15. FIG. 4B illustrates the pressure PB in the main battery 10. FIG. 4C illustrates the temperature TB of the main battery 10. FIG. 4D illustrates the charging mode of the auxiliary battery 70. FIG. 4E illustrates input power to the main battery 10. FIG. 4F illustrates the fuel efficiency FC.

FIGS. 3A to 3E illustrate a case in which the pressure PB in the main battery 10 is lower than the threshold pressure Pth, but FIGS. 4A to 4F illustrate a case in which the pressure PB in the main battery 10 slowly increases and the pressure PB reaches the threshold pressure Pth at time t1.

In FIGS. 3A to 3E, since PB<Pth is established, the magnitudes of the temperature TB of the main battery 10 and the second threshold temperature Tth2 are not determined. However, in FIGS. 4A to 4F, since PB≥Pth may be established, the magnitudes of the temperature TB and the second threshold temperature Tth2 are determined.

That is, at times t0 to t1, the pressure PB and the temperature TB of the main battery 10 slowly increase. At time t1, when the pressure PB in the main battery 10 reaches the threshold pressure Pth (PB≥Pth), the temperature TB of the main battery 10 reaches the second threshold temperature Tth2 (TB≥Tth2), and the difference between the target rotation speed RT and the actual rotation speed RA of the cooling fan reaches the first threshold rotation speed RTh1 (RT−RA≥Rth1), the charging mode is switched from M1 to M2.

In the second charging mode M2, since the SOC of the auxiliary battery 70 is 100%, the insufficiency in power is solved, the cooling fan is rotationally driven to follow the target rotation speed RT, and the actual rotation speed RA is equal to the target rotation speed RT. The other operations are the same as described with reference to FIGS. 3A to 3E and thus description thereof will not be repeated.

As described above, in Embodiment 1, when the cooling fan of the cooler 15 is driven at the target rotation speed RT, the SOC of the auxiliary battery 70 is limited to the range SOCL to SOCH less than 100% and it is thus possible to increase the charging efficiency of the auxiliary battery 70 and to improve the fuel efficiency FC.

When the cooling fan is not driven at the target rotation speed RT, the SOC of the auxiliary battery 70 is 100% and it is thus possible to enhance the cooling capability of the cooler 15 to delay the degradation of the main battery 10.

In Embodiment 1, the main DC/DC converter 60 is controlled such that the SOC of the auxiliary battery 70 is in the predetermined range SOCL to SOCH less than 100% in the first charging mode M1, but the invention is not limited to this embodiment. The main DC/DC converter 60 may be controlled such that the SOC of the auxiliary battery 70 is equal to a predetermined target value (for example, a median value between the lower limit SOCL and the upper limit SOCH) of the predetermined range SOCL to SOCH.

In the second charging mode M2, the SOC of the auxiliary battery 70 is set to 100%, but may be set to a value less than 100% but greater than the predetermined range SOCL to SOCH. For example, in the second charging mode M2, the SOC of the auxiliary battery 70 may be set to 90%.

Steps S1, S2 out of steps S1 to S5 illustrated in FIG. 2 may be skipped and only steps S3 to S5 may be performed. That is, it is first determined in step S4 whether RT−RA≥Rth1 is established, the first charging mode M1 is performed in step S3 when RT−RA≥Rth1 is not established, and the second charging mode M2 is performed in step S5 when RT−RA≥Rth1 is established. In this case, it is possible to achieve simplification of the device configuration.

Step S2 out of steps S1 to S5 illustrated in FIG. 2 may be skipped and only steps S1 and S4 to S5 may be performed. That is, it is determined in step S1 whether TB≥Tth1 is established, the first charging mode M1 is performed in step S3 when TB≥Tth1 is not established in step S1, and the process flow goes to step S4 when TB≥Tth1 is established. In this case, it is possible to achieve simplification of the device configuration.

In Embodiment 1, the cooler 15 includes the cooling fan cooling the main battery 10 by sending air to the main battery 10, but the invention is not limited to this configuration. The cooler 15 may cool the main battery 10 using another method. For example, the cooler 15 may include a pipe wound around the main battery 10, a cooler cooing a coolant, and a pump circulating the coolant to the pipe and the cooler. The coolant may be liquid such as water, or gas, or mixture of liquid and gas. The pump is supplied with the voltage Vs of the auxiliary battery 70 and is rotationally driven at a rotation speed corresponding to the target rotation speed RT. The rotation speed detector 16 detects the actual rotation speed RA of the pump. In this case, the same advantages as in Embodiment 1 can be achieved.

Embodiment 2 will be described below. In Embodiment 1, the SOC of the auxiliary battery 70 is detected by the SOC detector 71, and the charging mode is switched between the first charging mode M1 and the second charging mode M2 on the basis of the temperature TB of the main battery 10 or the like. However, in Embodiment 1, since the SOC of the auxiliary battery 70 is calculated on the basis of the voltage across terminals Vs, the charging and discharging currents, and the temperature of the auxiliary battery 70, there is a problem in that the device configuration is complicated. In Embodiment 2, such a problem is solved.

That is, since the SOC of the auxiliary battery 70 varies mainly depending on the voltage across terminals Vs, the SOC of the auxiliary battery 70 can be approximated with the voltage across terminals Vs. Accordingly, in Embodiment 2, the voltage across terminals Vs is detected as the approximate value of the SOC of the auxiliary battery 70, and the charging mode is switched between a first charging mode M1 in which the voltage Vs of the auxiliary battery 70 is set to the range between a lower limit VD lower than a rated voltage VR and an upper limit VU and a second charging mode M2 in which the voltage Vs of the auxiliary battery 70 is set to the rated voltage VR.

Figure 5:
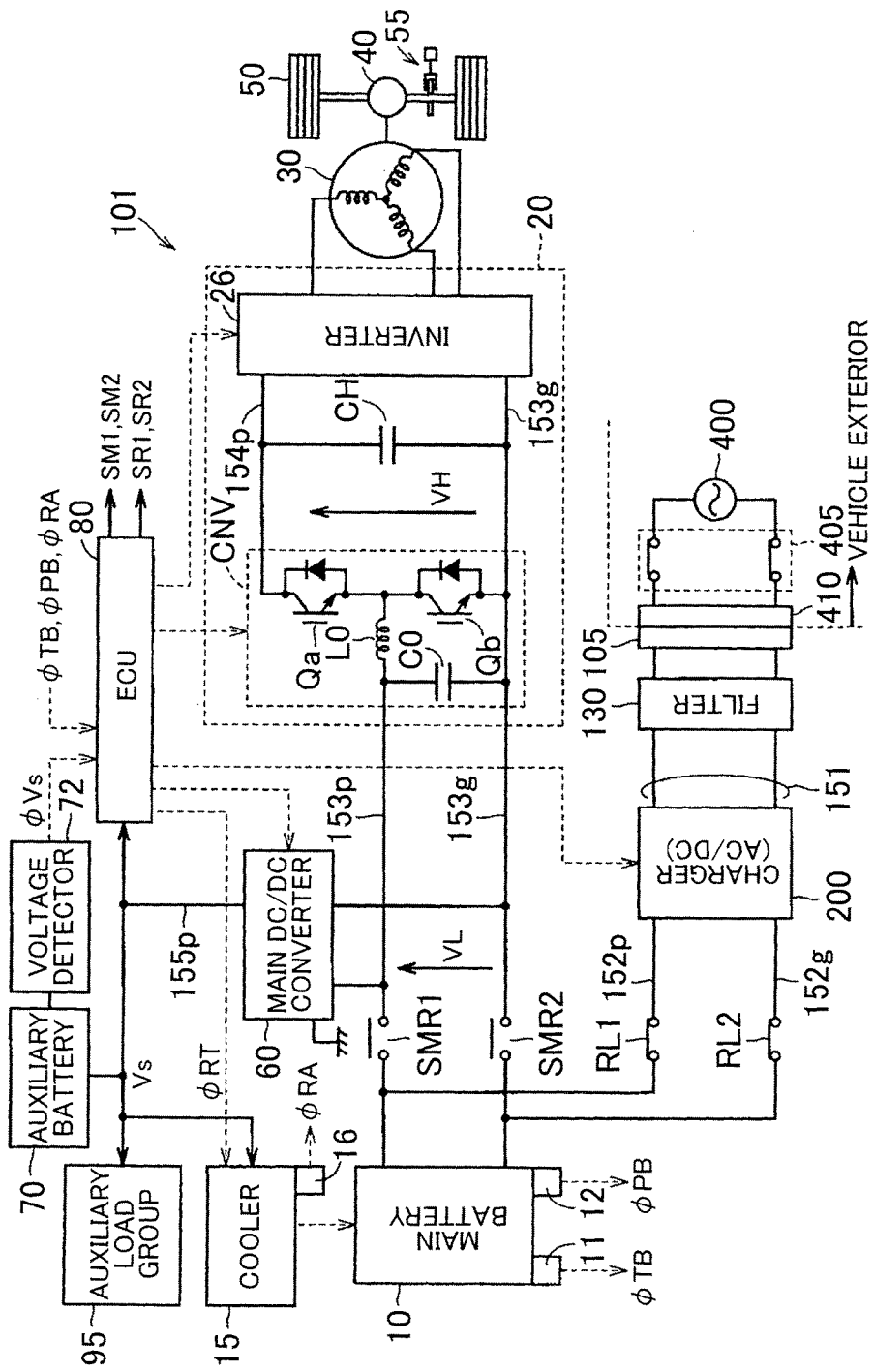
FIG. 5 is a circuit block diagram illustrating a configuration of an electric vehicle according to Embodiment 2 of the invention.

FIG. 5 is a circuit block diagram illustrating a configuration of an electric vehicle 101 according to Embodiment 2 of the invention, and corresponds to FIG. 1. Referring to FIG. 5, the electric vehicle 101 is different from the electric vehicle 100 illustrated in FIG. 1, in that the SOC detector 71 is replaced with a voltage detector 72. The voltage detector 72 detects the voltage across terminals Vs of the auxiliary battery 70 and outputs a signal ϕVs indicating the detected value to the ECU 80.

Figure 6:
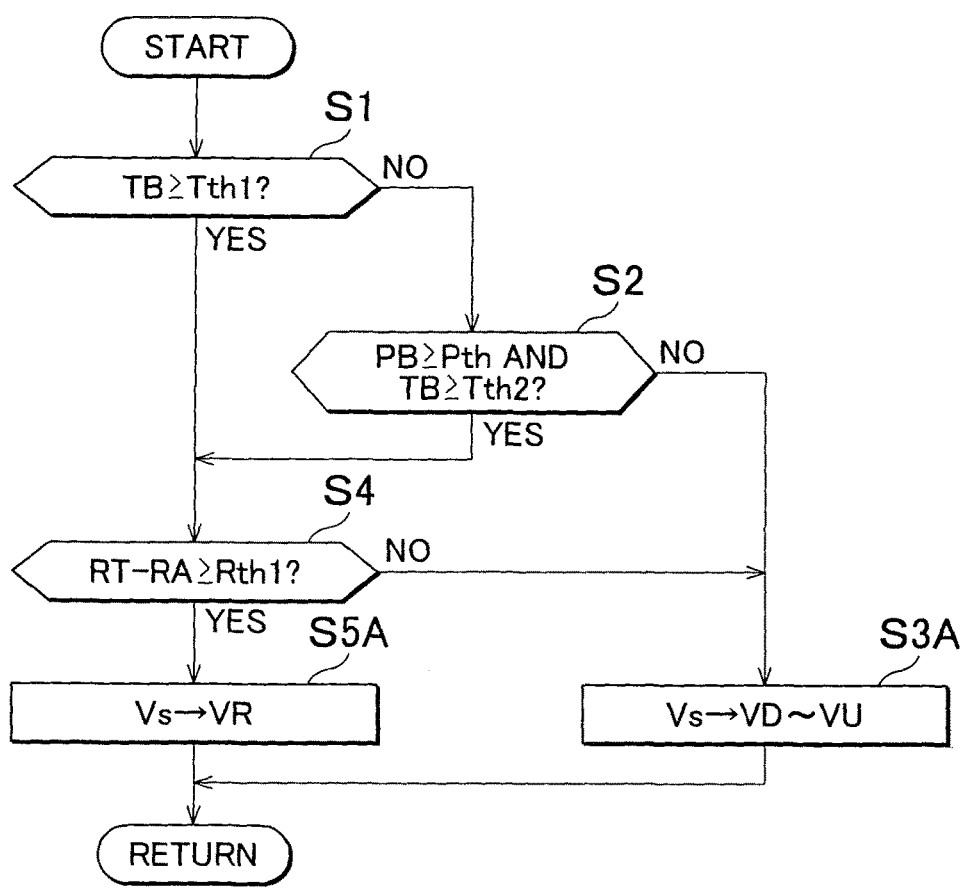
FIG. 6 is a flowchart illustrating a method of charging an auxiliary battery illustrated in FIG. 5.

FIG. 6 is a flowchart illustrating the operation of the electric vehicle 101 and corresponds to FIG. 2. The flowchart illustrated in FIG. 6 is different from the flowchart illustrated in FIG. 2, in that steps S3, S5 are replaced with steps S3A, S5A.

In step S3A, the ECU 80 controls the main DC/DC converter 60 such that the voltage Vs of the auxiliary battery 70 is in the range between the lower limit VD lower than the rated voltage VR and the upper limit VU. In step S5A, the ECU 80 controls the main DC/DC converter 60 such that the voltage Vs of the auxiliary battery 70 is equal to the rated voltage VR. The other configurations and operations are the same as in Embodiment 1 and description thereof will not be repeated.

In Embodiment 2, when the cooling fan of the cooler 15 is rotationally driven at the target rotation speed RT, the voltage Vs of the auxiliary battery 70 is limited to the range VD to VU less than the rated voltage VR and it is thus possible to increase the charging efficiency of the auxiliary battery 70 and thus to improve the fuel efficiency FC.

When the cooling fan is not rotationally driven at the target rotation speed RT, the voltage Vs of the auxiliary battery 70 is set to the rated voltage VR and it is thus possible to increase the cooling capability of the cooler 15 to delay the degradation of the main battery 10.

Since the voltage across terminals Vs is detected instead of the SOC of the auxiliary battery 70, it is possible to achieve simplification of the device configuration.

In Embodiment 2, the main DC/DC converter 60 is controlled such that the voltage Vs of the auxiliary battery 70 is in the predetermined range VD to VU less than the rated voltage VR in the first charging mode M1, but the invention is not limited to this configuration. The main DC/DC converter 60 may be controlled such that the voltage Vs of the auxiliary battery 70 is equal to a predetermined target value (for example, a median value between the lower limit VD and the upper limit VU) of the predetermined range VD to VU.

In the second charging mode M2, the voltage Vs of the auxiliary battery 70 is set to the rated voltage VR, but may be set to be less than the rated voltage VR as long as it is a value greater than the predetermined range VD to VU. For example, in the second charging mode M2, the voltage Vs of the auxiliary battery 70 may be set to a 90% voltage of the rated voltage VR.

FIGS. 7A, 7B are timing diagrams illustrating a first modification example of Embodiment 2. In the first modification example, in order to prevent erroneous detection due to the influence of noise, sudden variation, and variation based on feedback, an smoothed target rotation speed RTS and an smoothed actual rotation speed RAS are used as the target rotation speed RT and the actual rotation speed RA of the cooling fan, respectively, as illustrated in FIG. 7A. The smoothed value is calculated by a calculation expression such as "present smoothed value=actual value+(previous smoothed value−actual value)×smoothing rate".

When the difference between the smoothed target rotation speed RTS and the smoothed actual rotation speed RAS is equal to or greater than a predetermined value α, a cooling insufficiency determination flag F1 is raised from a "L" level to a "H" level and the charging mode is switched from M1 to M2, as illustrated in FIG. 7B. A value obtained by adding a gain of about 0.8 to 0.9 determined from a hardware deviation or the like to an original value is used as the predetermined value α. The predetermined value α is set to a value which is considered not to be affected when the rotation speed varies but the hardware is not changed in order to reduce a labor for changing the value for each vehicle and for each phase. In this modification example, it is possible to reduce an influence of noise.

FIGS. 8A, 8B are timing diagrams illustrating a second modification example of Embodiment 2 and correspond to FIGS. 7A, 7B. When the cooling fan is started in a stopped state, the operation of the cooling fan is delayed with respect to the target rotation speed RT. When the smoothed actual rotation speed RAS is calculated from the first time using the actual rotation speed RA, there is a possibility to erroneously detect that the difference between RTS and RAS is large due to the influence of the delay at the time of starting the cooling fan. Accordingly, in this modification example, the smoothed actual rotation speed RAS is calculated using the actual rotation speed RA after the cooling fan is stably operated (after time t2) and it is determined whether the difference between the smoothed target rotation speed RTS and the smoothed actual rotation speed RAS is equal to or greater than the predetermined value α. In this modification example, it is possible to prevent an erroneous operation at the time of starting the cooling fan.

In the first modification example illustrated in FIGS. 7A, 7B and the second modification example illustrated in FIGS. 8A, 8B, in order to prevent erroneous determination due to a response delay of hardware and an influence of noise, it may be determined that the cooling capability is insufficient when a state in which the cooling capability is insufficient is continued for a predetermined time.

Figures 10A, 10B, 10C:
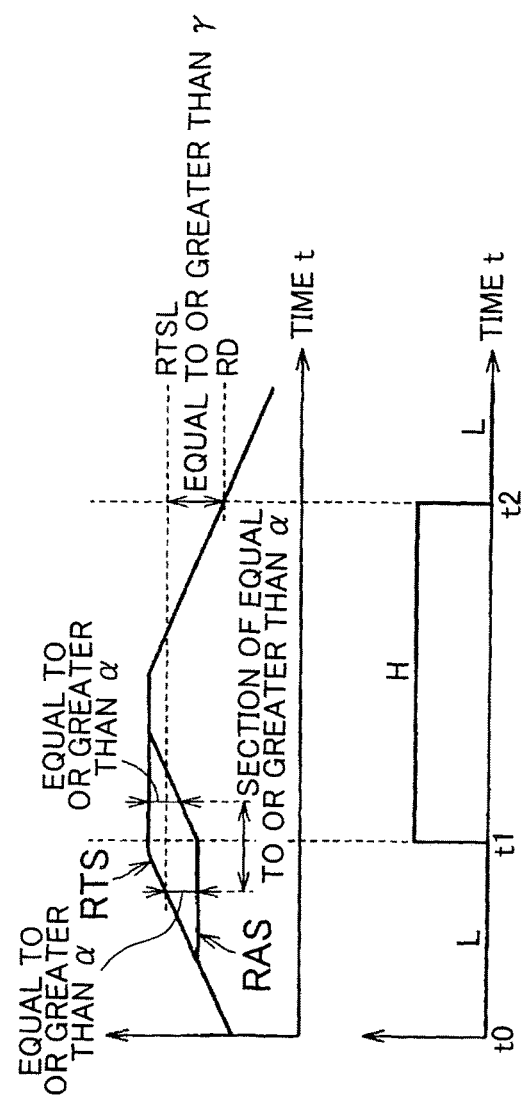
FIGS. 10A to 10C are timing diagrams illustrating a fourth modification example of Embodiment 2.

FIGS. 9A, 9B and FIGS. 10A, 10B are timing diagrams illustrating a third modification example and a fourth modification example of Embodiment 2. FIGS. 9A, 10A illustrate the voltage across terminals Vs of the auxiliary battery 70, FIGS. 9B, 10B illustrate the smoothed target rotation speed RTS and the smoothed actual rotation speed RAS, and FIGS. 9C, 10C illustrate the cooling insufficiency determination flag F1. FIGS. 9A, 9B are different from FIGS. 10A, 10B, in a variation pattern of the voltage across terminals Vs of the auxiliary battery 70 or the like.

In the third modification example and the fourth modification example, when the period in which the difference between smoothed target rotation speed RTS and the smoothed actual rotation speed RAS is equal to or greater than the predetermined value α is greater than a predetermined time, the cooling insufficiency determination flag F1 rises from the "L" level to the "H" level (at time t1). When the flag F1 is at the "H" level, the charging mode is switched from M1 to M2 and the voltage across terminals Vs of the auxiliary battery 70 increases from 12.5 V to 14 V (rated voltage).

By causing the flag F1 to fall to the "L" level to decrease the voltage across terminals Vs of the auxiliary battery 70 immediately when the insufficiency of the cooling capability of the cooler 15 is solved by increasing the voltage across terminals Vs of the auxiliary battery 70, the cooling capability becomes insufficient, the flag F1 rises to the "H" level, and the charging mode is frequently switched between M1 and M2.

Therefore, in the third modification example and the fourth modification example, when the flag F1 is at the "H" level, the difference between the smoothed target rotation speed RTS and the smoothed actual rotation speed RAS becomes less than the predetermined value α. When the RTS is equal to or less than a cooling capability return determination rotation speed RD, the flag F1 is made to fall to the "L" level. RD is set to a value obtained by subtracting a predetermined value γ from the minimum smoothed target rotation speed RTSL in a state in which the difference between the smoothed target rotation speed RTS and the smoothed actual rotation speed RAS is equal to or greater than the predetermined value α. γ is set to a value obtained by multiplying an original value by a gain of about 0.8 to 0.9 determined from a hardware deviation or the like.

FIGS. 11A, 11B are timing diagrams illustrating a fifth modification example of Embodiment 2 and correspond to FIGS. 10A, 10B. FIGS. 11A, 11B are different from FIGS. 10A, 10B, in a variation pattern of the voltage across terminals Vs of the auxiliary battery 70 or the like.

In the fifth modification example, the lower limit ω of the cooling capability return determination rotation speed RD is determined in advance. In the state in which the difference between the smoothed target rotation speed RTS and the smoothed actual rotation speed RAS is equal to or greater than the predetermined value α, a value RDA obtained by subtracting the predetermined value γ from the minimum smoothed target rotation speed RTSL is calculated. When the calculated value RDA is greater than the lower limit ω, the cooling capability return determination rotation speed RD is set to RDA. When the calculated value RDA is equal to or less than the lower limit ω, the cooling capability return determination rotation speed RD is set to ω. In FIGS. 11A, 11B, a case in which the flag F1 falls from the "H" level to the "L" level when RTS is equal to ω is illustrated. In this modification example, the cooling capability return determination rotation speed RD can be limited to be equal to or greater than the lower limit ω.

Embodiment 3 of the invention will be described below. In Embodiment 1, as illustrated in FIG. 2, it is determined in step S4 whether the difference between the target rotation speed RT and the actual rotation speed RA of the cooling fan is equal to or greater than the first threshold rotation speed RTh1. However, in Embodiments 1, 2, since the difference between the target rotation speed RT and the actual rotation speed RA of the cooling fan needs to be calculated, there is a problem in that the device configuration is complicated. In Embodiment 3, this problem is solved.

That is, as can be seen from FIGS. 3A, 4A, when the target rotation speed RT is equal to or greater than a certain value (this value is defined as a second threshold rotation speed RTh2) in the first charging mode M1, the actual rotation speed RA does not follow the target rotation speed RT. Accordingly, in Embodiment 3, the charging mode is switched from the first charging mode M1 to the second charging mode M2 when RT≥Rth2 is established.

Figure 12:
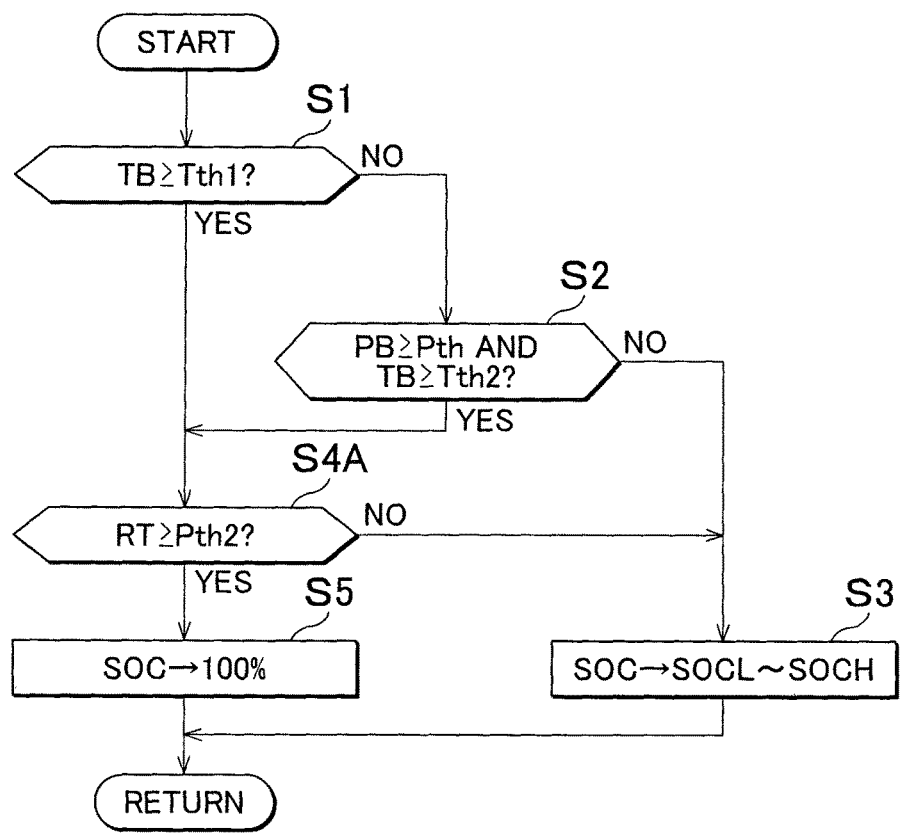
FIG. 12 is a flowchart illustrating a method of charging an auxiliary battery in an electric vehicle according to Embodiment 3 of the invention.

FIG. 12 is a flowchart illustrating an operation of an electric vehicle according to Embodiment 3 and corresponds to FIG. 2. The flowchart illustrated in FIG. 12 is different from the flowchart illustrated in FIG. 2, in that step S4 is replaced with step S4A. in step S4A, the ECU 80 determines whether RT≥Rth2 is established, sets the SOC of the auxiliary battery 70 to 100% in step S5 when RT≥Rth2 is established, and sets the SOC of the auxiliary battery 70 to 100% in step S3 when RT≥Rth2 is not established.

Figures 13A, 13B, 13C:
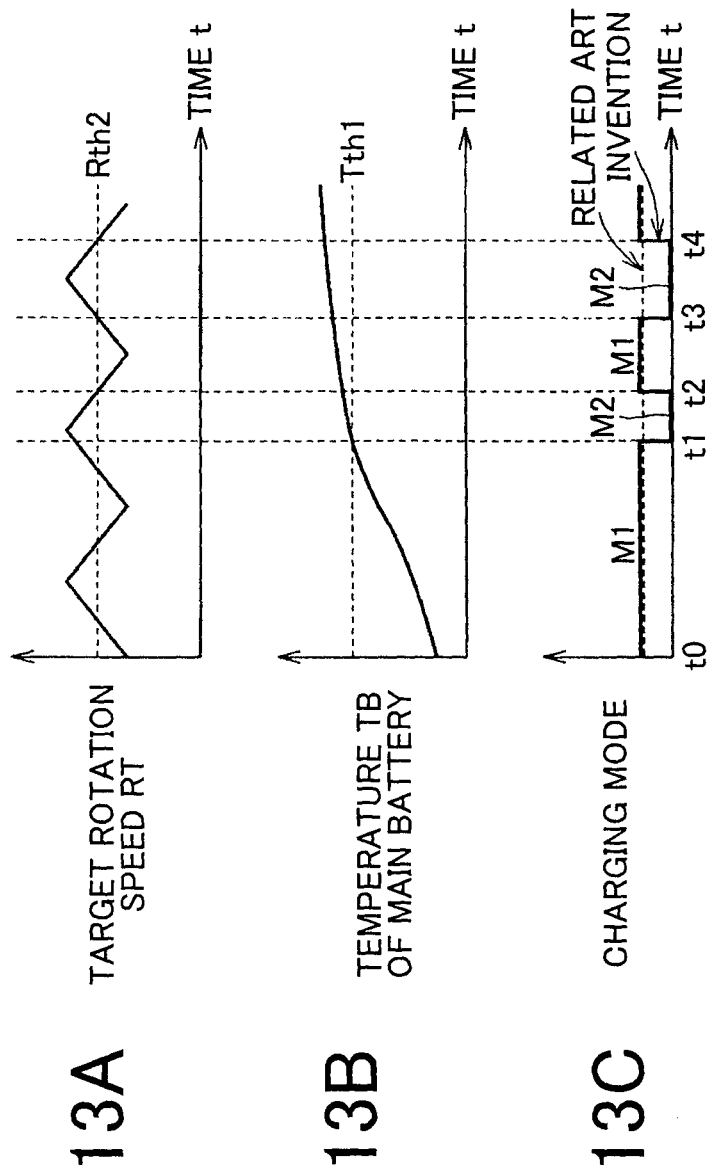
FIGS. 13A to 13C are timing diagrams illustrating operations of the electric vehicle illustrated in FIG. 12.

FIGS. 13A to 13C are timing diagrams illustrating the operation of the electric vehicle according to Embodiment 3 and corresponds to FIGS. 3A to 3C. In FIGS. 13A to 13C, in Embodiment 3, when the temperature TB of the main battery 10 is equal to or higher than the first threshold temperature Tth1 and the target rotation speed RT is equal to or greater than the second threshold rotation speed RTh2, the charging mode is switched from M1 to M2. The other configurations and operations are the same as in Embodiment 1 and description thereof will not be repeated.

In Embodiment 3, the same advantages as in Embodiment 1 can be obtained. In addition, since the charging mode can be switched on the basis of the target rotation speed RT regardless of the actual rotation speed RA, it is possible to achieve simplification of the configuration.

Steps S3, S5 illustrated in FIG. 12 may be replaced with steps S3A, S5A illustrated in FIG. 6.

FIGS. 14A, 14B are timing diagrams illustrating a first modification example of Embodiment 3. In the first modification example, in order to prevent erroneous detection due to the influence of noise, sudden variation, and variation based on feedback, an smoothed target rotation speed RTS is used as the target rotation speed RT of the cooling fan as illustrated in FIG. 14A. When the smoothed target rotation speed RTS is equal to or greater than a predetermined value β, the cooling insufficiency determination flag F1 is raised from a "L" level to a "H" level and the charging mode is switched from M1 to M2, as illustrated in FIG. 14B. A value obtained by adding a gain of about 0.8 to 0.9 determined from a hardware deviation or the like to an original value is used as the predetermined value β. The predetermined value β is set to a value which is considered not to be affected when the rotation speed varies but the hardware is not changed in order to reduce a labor for changing the value for each vehicle and for each phase. In this modification example, it is possible to reduce an influence of noise.

In the first modification example illustrated in FIGS. 14A, 14B, in order to prevent erroneous determination due to a response delay of hardware and an influence of noise, it may be determined that the cooling capability is insufficient when a state in which the cooling capability is insufficient is continued for a predetermined time.

FIGS. 15A, 15B are timing diagrams illustrating a second modification example of Embodiment 3. By switching the flag F1 to the "L" level to switch charging mode from M2 to M1 immediately when the insufficiency of the cooling capability of the cooler 15 is solved after the charging mode is switched from M1 to M2 by causing the flag F1 to rise to the "H" level, the cooling capability becomes insufficient, the flag F1 rises to the "H" level, and the charging mode is frequently switched between M1 and M2.

Accordingly, in the second modification example, when the flag F1 is at the "H" level and the smoothed target rotation speed RTS is equal to or less than σ less than the predetermined value β, the flag F1 is made to fall to the "L" level. As a result, it is possible to prevent the charging mode from being frequently switched between M1 and M2.

The invention claimed is:

1. A power supply device for an electric vehicle, the power supply device comprising:
   a primary electric storage device configured to store electric power for driving an electric motor coupled to wheels of the electric vehicle;
   a secondary electric storage device configured to store direct current power for driving an auxiliary load;
   a direct current/direct current converter configured to step down a voltage of the primary electric storage device, the direct current/direct current converter being configured to supply the voltage to the secondary electric storage device to charge the secondary electric storage device;
   a cooler configured to be supplied with a source voltage from the secondary electric storage device, the cooler being configured to be driven depending on a target drive value to cool the primary electric storage device;
   a first detector configured to detect a temperature of the primary electric storage device;
   a second detector configured to detect a state of charge of the secondary electric storage device;
   a third detector configured to detect an actual drive value of the cooler; and
   an electronic control unit configured to:
   (a) operate based on detection results of the first detector, the second detector and the third detector,
   (b) supply the target drive value to the cooler, the target drive value being a value corresponding to the temperature of the primary electric storage device,
   (c) perform a first charging mode, the electronic control unit being configured to control the direct current/direct current converter in the first charging mode so that the state of charge of the secondary electric storage device is in a predetermined range less than a maximum value, when the cooler is driven at the target drive value, and
   (d) perform a second charging mode, the electronic control unit being configured to control the direct current/direct current converter in the second charging mode so that the state of charge of the secondary electric storage device is a value greater than the predetermined range, when the cooler is not driven at the target drive value.

2. The power supply device according to claim 1, wherein the value greater than the predetermined range is a maximum value of the state of charge of the secondary electric storage device.

3. The power supply device according to claim 1, wherein the electronic control unit is configured to determine that the cooler is driven at the target drive value and to perform the first charging mode, when a difference between the target drive value and the actual drive value is less than a first threshold value, and
the electronic control unit is configured to determine that the cooler is not driven at the target drive value and to perform the second charging mode, when the difference between the target drive value and the actual drive value is equal to or greater than the first threshold value.

4. The power supply device according to claim 3, wherein the electronic control unit is configured to stop the second charging mode and to perform the first charging mode, when the second charging mode is performed and the target drive value is less than a second threshold value less by a predetermined value than a minimum value of the target drive value in a period, the difference between the target drive value and the actual drive value is equal to or greater than the first threshold value in the period.

5. The power supply device according to claim 1, wherein the electronic control unit is configured to determine that the cooler is driven at the target drive value and to perform the first charging mode, when the target drive value is less than a first threshold value, and
the electronic control unit is configured to determine that the cooler is not driven at the target drive value and to perform the second charging mode, when the target drive value is equal to or greater than the first threshold value.

6. The power supply device according to claim 5, wherein the electronic control unit is configured to stop the second charging mode and to perform the first charging mode, when the second charging mode is performed and the target drive value is less than a second threshold value less by a predetermined value than the first threshold value.

7. The power supply device according to claim 1, wherein the electronic control unit is configured to determine whether the cooler is driven at the target drive value and to perform the first charging mode or the second charging mode, when the temperature of the primary electric storage device is equal to or higher than a third threshold value, and
the electronic control unit is configured to perform the first charging mode, when the temperature of the primary electric storage device is lower than the third threshold value.

8. The power supply device according to claim 7, further comprising:
a fourth detector configured to detect a pressure in the primary electric storage device, wherein
the electronic control unit is configured to determine whether the cooler is driven at the target drive value and to perform the first charging mode or the second charging mode, when the temperature of the primary electric storage device is lower than the third threshold value and the temperature of the primary electric storage device is equal to or higher than a fourth threshold value less than the third threshold value and when the pressure in the primary electric storage device is equal to or greater than a fifth threshold value.

9. The power supply device according to claim 1, wherein the second detector is configured to detect the voltage of the secondary electric storage device as an approximate value of the state of charge of the secondary electric storage device, the electronic control unit is configured to control the direct current/direct current converter so that the voltage of the secondary electric storage device is in a predetermined voltage range less than a rated voltage in the first charging mode, and the electronic control unit is configured to control the direct current/direct current converter so that the voltage of the secondary electric storage device is a value greater than the predetermined voltage range in the second charging mode.

10. The power supply device according to claim 1, wherein the cooler includes a cooling fan that sends air to the primary electric storage device, the target drive value is a target rotation speed of the cooling fan, and the actual drive value is an actual rotation speed of the cooling fan.

11. The power supply device according to claim 1, wherein the cooler includes a pump that circulates a coolant for cooling the primary electric storage device, the target drive value is a target rotation speed of the pump, and the actual drive value is an actual rotation speed of the pump.

* * * * *